United States Patent [19]

Kamiyama et al.

[11] Patent Number: 5,780,123
[45] Date of Patent: Jul. 14, 1998

[54] TUBULAR LINER AND A METHOD FOR CONNECTING ENDS OF LINER TUBES

[75] Inventors: Takao Kamiyama, Hiratsuka; Yasuhiro Yokoshima, Ibaraki-ken, both of Japan

[73] Assignees: Yokoshima & Company, Ibaraki-ken; Shonan Gosei-Jushi Seisakusho K.K., Kanagawa-ken, both of Japan

[21] Appl. No.: 601,752

[22] Filed: Feb. 15, 1996

[30] Foreign Application Priority Data

Mar. 23, 1995 [JP] Japan .................................. 7-063973

[51] Int. Cl.[6] .............................. F16L 55/16; F16L 9/20
[52] U.S. Cl. ................ 428/35.2; 428/36.1; 428/36.91; 428/58; 428/61; 428/102; 138/98; 138/150; 138/154
[58] Field of Search .......................... 428/35.2, 36.1, 428/36.91, 57, 58, 61, 102, 104; 138/98, 154, 150

[56] References Cited

U.S. PATENT DOCUMENTS 5,356,502  10/1994  Kamiyama et al. .................... 156/267
5,397,612   3/1995  Small et al. ............................ 428/36.1

FOREIGN PATENT DOCUMENTS 60-242038  12/1985  Japan .

*Primary Examiner*—Rena Dye
*Attorney, Agent, or Firm*—McDermott, Will & Emery

[57] ABSTRACT

A tubular liner, for lining the inner wall of a pipe, comprises a plurality of composite liner tubes, each liner type contains an inner layer of a resin-absorbable sheet and an outer layer of hermetic plastic film. The composite liner tubes are joined by spirally stitched abutting ends. In an embodiment, the inner resin-absorbable sheets are joined. An adhesive can be applied to the inner and outer walls of the resin-absorbable sheet along the stitched spiral seam.

3 Claims, 5 Drawing Sheets

PRIOR ART

TUBULAR LINER AND A METHOD FOR CONNECTING ENDS OF LINER TUBES

BACKGROUND OF THE INVNETION

1. Field of the Invention

The present invention relates to a tubular liner which is used to line the inner wall of defective underground pipes such as pipelines and sewerage pipes and a method for connecting ends of such liners.

2. Description of the Prior Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a curable liquid resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner bag completely and fixedly covers and closes the pipe end; a portion of the liner bag is pushed into the pipe; then, the pressurized fluid is applied to the said portion of the tubular liner bag such that the fluid urges the tubular liner bag to enter the pipe. Since the open end of the tubular liner bag is hooked at the end of the pipe, it remains there while the rest of the flexible liner bag is turned inside out as it proceeds deeper in the pipe. (Hereinafter, this manner of insertion shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid or by an inflatable pressure bag, and the tubular flexible liner is hardened as the curable liquid resin impregnated through the thickness of the liner is cured, which is effected, in the case of a thermosetting resin, by heating the fluid filling the tubular liner bag by means of a hot steam, etc. It is thus possible to line the inside wall of the defective or old pipe with rigid liner without digging the ground and disassembling the pipe sections.

Now, the tubular liner bag used in such non-digging method of repairing an underground pipe is mass-produced and there are several regular-sized liner bags available, sizes in terms of length as well as diameter. However, when the length of a pipe to be repaired is not common, no readily available liner bag can meet the length requirement, and therefore, a liner bag of a regular size which is not shorter than the pipe to be repaired is used after being cut to the appropriate length. The cut-off portion of the liner bag is often of a substantial length and a big waste.

It has therefore been considered to make use of such relatively costly cut-off portions of the liner bag. The present inventors had long thought of connecting the cut-off portion to a standard-sized liner bag end-to-end so as to obtain a new liner bag that would suit an uncommon-sized pipe, either as it is or after slicing off a short portion from it. Or, the inventors also thought to connect a number of cut-off portions (also called "liner tubes", throughout this application) together to obtain a longer tubular liner bag and then tailor it to a suitable length for a pipe to be repaired. Therefore, they had kept the cut-off liner tubes and conducted diligent experiments with them hoping to arrive at a method for effectively connecting the ends of the otherwise useless cut-off liner tubes of the liner bag.

One conventional method for connecting ends of two liner tubes is to bring the ends of the liner tubes 101, 111 in contact with each other and then sew them together with even stitches of a thread 104, as shown at (a) of FIG. 12. However, a problem with this connecting method is that when the curable liquid resin, which is absorbed through the tissue of the liner tubes 101, 111, is cured by heat or some other means the liner tubes 101, 111 shrink with hardening and the connected ends of the liner tubes 101, 111 are caused to detach from each other and a gap is formed between them, as shown at (b) of FIG. 12.

Another conventional method for connecting ends of two liner tubes is to bring the ends of the liner tubes 201, 211 in contact with each other and then an adhesive tape 205 made of a material of high strength is pasted over the seam from outside, as shown at (a) of FIG. 13. However, a problem with this connecting method is that when a pipe 220 is lined with this integrated tubular liner 201, 211 by eversion thereof, the thick tape 205 forms an inward protrusion to narrow the space in the pipe 220 at the location.

Therefore, the present invention was made in view of the above problems and it is an object of the invention to provide a novel structure and method for connecting ends of liner tubes such that when the liner tubes are hardened no gap is formed between the connected ends of the liner tubes and such that the connection is effected without forming a protrusion that narrows the passage space of the pipe to be repaired.

SUMMARY OF THE INVENTION

In order to solve the above problems and others, a novel tubular liner is provided which consists of at least two liner tubes connected in series, wherein any of two neighboring liner tubes are connected to each other end to end with stitches which bind the abutted ends of the respective liner tubes closely together, characterized by that the thus formed seam generally describes one turn or flight of a spiral.

In an embodiment of the invention, each liner tube consists of an inner layer of a resin absorbent sheet and an outer layer of a hermetic plastic film, and the stitches bind abutted ends of respective resin absorbent sheets of any two neighboring liner tubes together and the thus formed seam generally describes one flight of a spiral.

There is also provided a novel method for connecting two liner tubes which each have a straight lengthwise seam, and this method comprises steps of: (a), in both of the liner tubes, cutting open the liner tube along the seam through a predetermined length; (b), in both of the liner tubes, cutting the opened portion of the liner tube along a straight line which is slanted from the edge line by an angle substantially greater than 0 degree and substantially smaller than 90 degrees; and (c) abutting and stitching together the thus cut ends of the liner tubes in a manner such that the two liner tubes form a straight integral liner tube.

In a preferred embodiment of the invention, the method involves two liner tubes each having an inner layer of a resin absorbent sheet and an outer layer of a hermetic plastic film, the resin absorbent sheet layer being a sheet tube having a straight lengthwise seam along which the long sides of the sheet is stitched; and the method comprises steps of: (a), in both of the liner tubes, turning over the outer layer film at that end of the liner tube to be connected thereby exposing a predetermined length of the sheet layer; (b), in both of the liner tubes, unthreading that portion of the thread with which the exposed portion of the sheet layer is stitched lengthwise; (c), in both of the liner tubes, unrolling and partially flattening that portion of the sheet which is unthreaded; (d), in both of the liner tubes, cutting the flattened portion of the sheet along a straight line which is slanted from the edge line of the flattened portion of the sheet by an angle substantially greater than 0 degree and substantially smaller than 90 degrees; (e) abutting together the thus cut ends of the sheets of the two liner tubes in a manner such that the lengthwise seams of the two liner tubes can lie collinearly; (f) stitching together the cut ends of the sheets; (g) rolling up the opened sheets to make them tubular again; (h) re-stitching the sheets along their long sides until the lengthwise seam of the connected tubular sheets becomes unbroken; and (i), in both of the liner tubes, unrolling the overturned film layer so as to cover up the exposed portions of the sheet again.

According to the invention, therefore, since the two liner tubes are stitched together along a spiral line, the length of the stitching becomes much longer than that in the case of stitching along the cut ends which are cut orthogonally to the lengthwise seams of the liner tubes, so that the joining strength becomes stronger, and consequently even after the curable liquid resin wetting the resin absorbent sheets is cured, the jointed ends do not detach from each other and a gap is scarcely formed between the abutted ends.

Also, the adhesive tape pasted on the inner wall and the outer wall of the resin absorbent sheets extends spirally, so that this tape does not constrict the passage in the pipe to be repaired at the joint location.

The above and other objects and features of the invention will appear more fully hereinafter in the following description given in connection with the accompanying drawings and the novelty thereof pointed out in the appended claims.

DESCRIPTION OF THE PREFERRED EMBODIMENT

Next, an embodiment of the invention will be described with reference to the attached drawings.

FIGS. 1 through 11 are drawings of liner tubes, illustrating steps of the method for connecting ends of them in order of the sequence.

Figure 1:
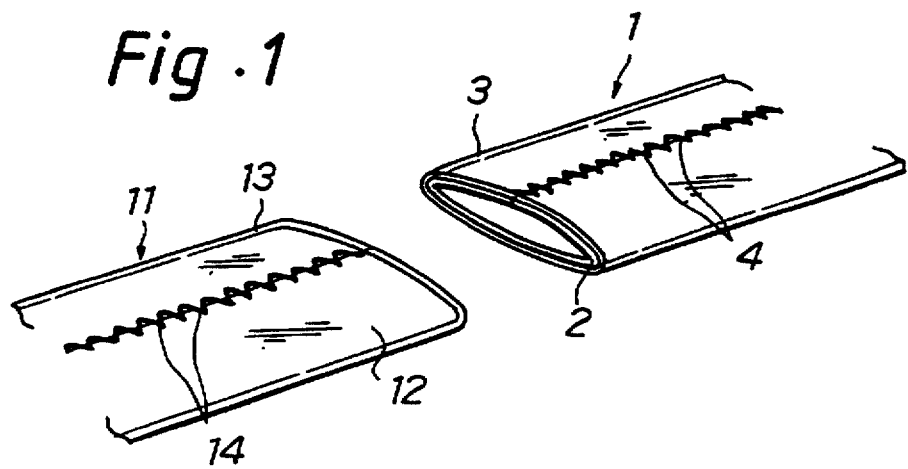
FIG. 1 is a perspective view of two liner tubes, illustrating a step of the liner tube connecting method of the present invention.

In FIG. 1, the reference numerals 1 and 11 designate two liner tubes to be connected end to end. These liner tubes can be ones cut from finished tubular liner bags or freshly made liner tubes. In either case they are in principle made in the following manner. Rectangular sheets 2, 12 of resin absorbent material are made from a nonwoven fabric obtained by bonding or punch-pressing a mass of fiber such as of polyester, nylon, acrylic resin, polypropylene, carbon, and glass, or a mixture of some of these. The resin absorbent sheet is then cut to rectangular shape and rolled up such that the long sides of the rectangular sheet meet each other to form a tube; then, the long sides are sewed together with threads 4, 14. The tubular sheets 2, 12 are passed inside flexible plastic film tubes 3, 13, respectively. These film tubes 3, 13 are made of a highly airtight material such as polyurethane, polyvinylchloride, polyethylene, EVA, and nylon, and have diameters substantially greater than the outer diameter of the rolled resin absorbent sheet tubes 2, 12; hence it is relatively easy to pass the sheet tubes 2, 12 inside the film tubes 3, 13, and as of the insertion the film tubes 3, 13 envelop the sheet tubes 2, 12 only loosely. Incidentally, it is also practiced that the plastic film tube consists of a lamination of more than one films of different materials selected from those described above.

Figure 2:
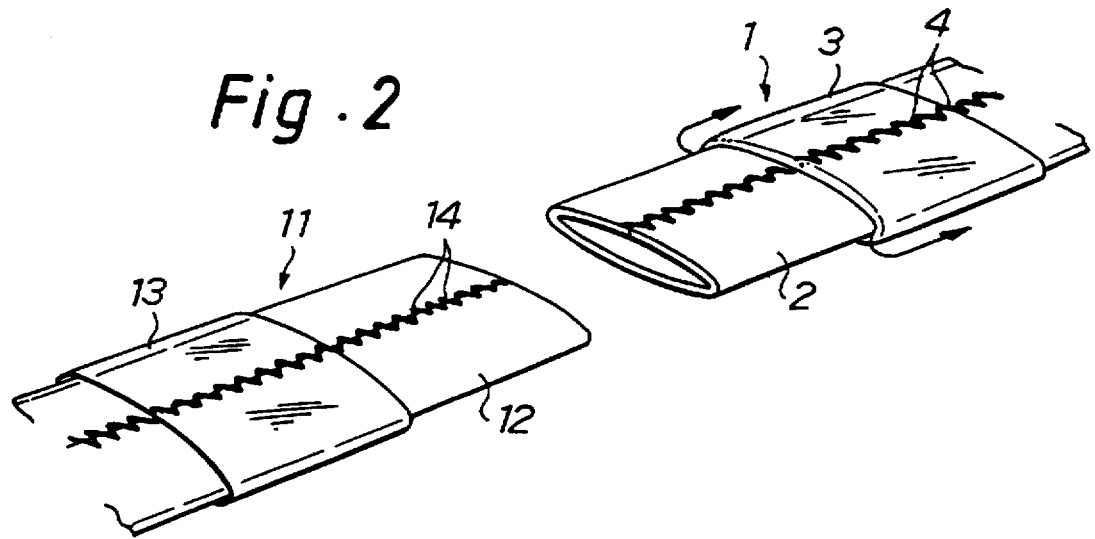
FIG. 2 is a perspective view of two liner tubes, illustrating another step of the liner tube connecting method of the present invention.
Figure 3:
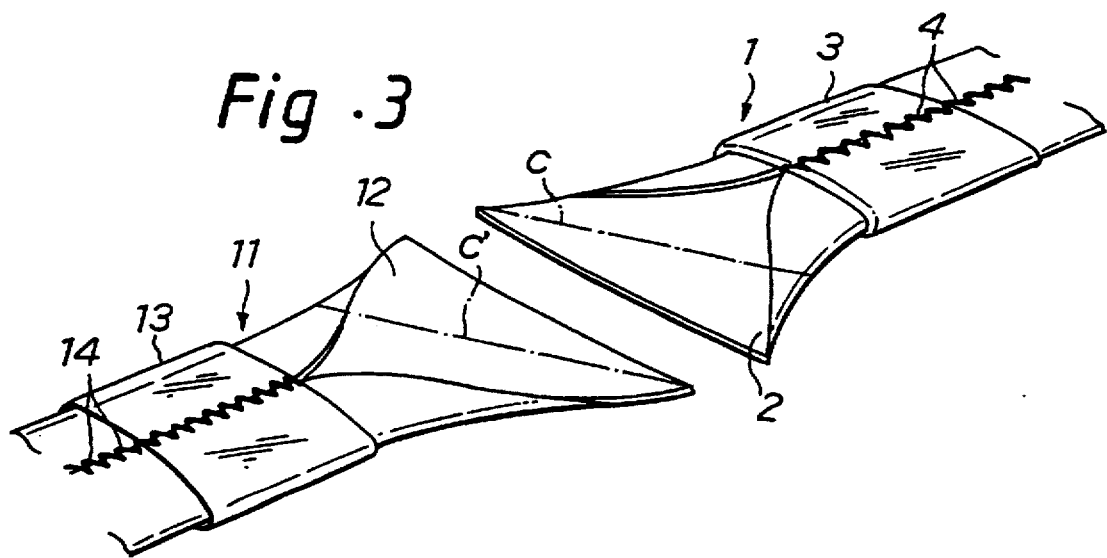
FIG. 3 is a perspective view of two liner tubes, illustrating another step of the liner tube connecting method of the present invention.

Now, after preparing such liner tubes 1, 11, the loose film tubes 3, 13 are turned over at the ends of the liner tubes 1, 11 to be connected, and pulled away from said ends until the sheet tubes 2, 12 are exposed over a predetermined length each, as shown in FIG. 2. Thereafter, that portions of the threads 4, 14 which are now exposed are cut and removed, and that portions of the sheets 2, 12 which are thus undone are unrolled and flattened as wide as possible, as shown in FIG. 3. These flattened portions of the sheets 2, 12 are cut along one-dot chain lines c, c', respectively, which are drawn obliquely such that they are slanted from the front edge line by an angle substantially greater than 0 degree and substantially smaller than 90 degrees, as shown in FIG. 3.

Figure 4:
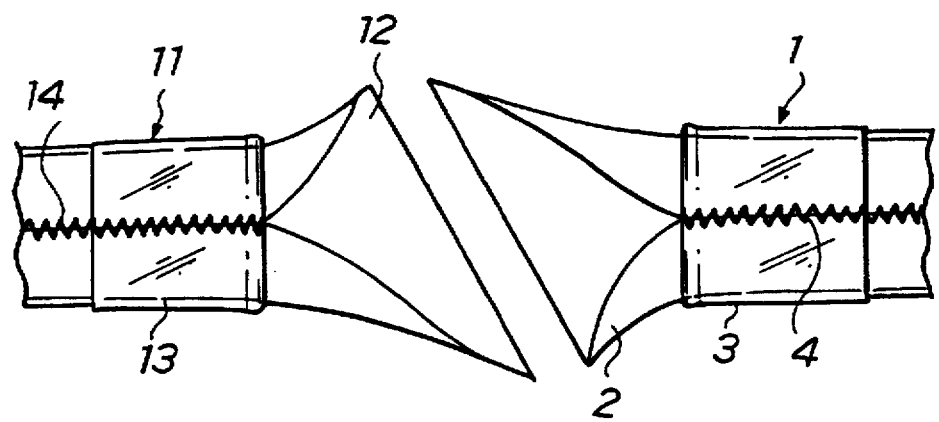
FIG. 4 is a top plan view of two liner tubes, illustrating another step of the liner tube connecting method of the present invention.
Figure 5:
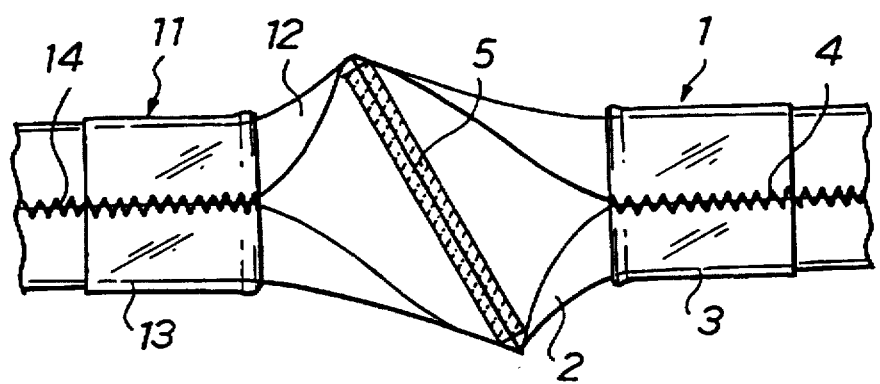
FIG. 5 is a top plan view of two liner tubes, illustrating another step of the liner tube connecting method of the present invention.
Figure 6:
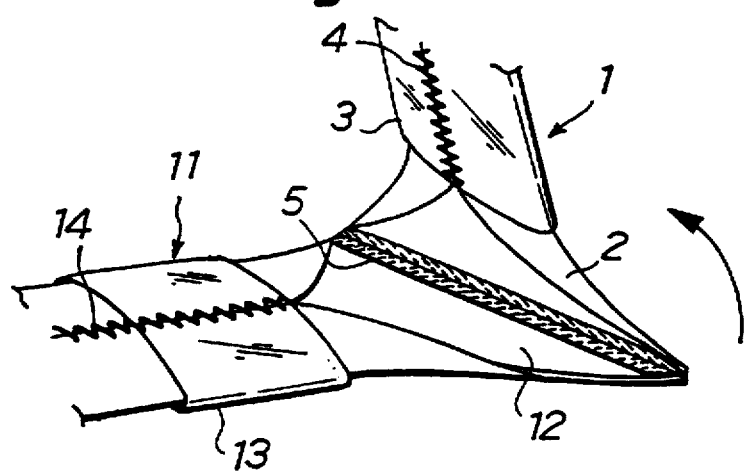
FIG. 6 is a perspective view of two liner tubes, illustrating another step of the liner tube connecting method of the present invention.

As the result, the cut ends of the sheets 2, 12 become parallel with each other when the liner tubes 1, 11 are placed in a manner such that their seams are collinear and the cut ends are opposed to each other, as shown in FIG. 4. Now, these cut ends are brought together, and a thin tape 5 of a nonwoven fabric with one side coated with an adhesive layer is pasted on the inner side of the sheets 2, 12 along the line at which the cut ends of the sheets 2, 12 meet, as shown in FIG. 5, so as to tentatively connect the resin absorbent sheets 2, 12 together.

Figure 7:
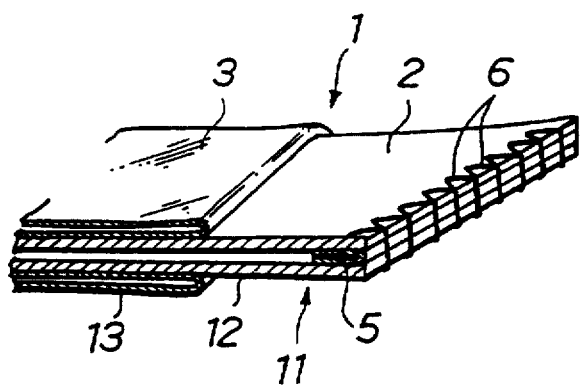
FIG. 7 is a perspective view of two liner tubes, illustrating another step of the liner tube connecting method of the present invention.

When the two liner tubes 1, 11 thus become one tentatively, one of them, 1 in this embodiment, is raised at the free end (FIG. 6) and turned over to lie on the other liner tube, 11 in this case, so that the tentatively integral tube is folded at the line at which the cut ends of the sheets 2, 12 meet, as shown by cross-section in FIG. 7. Then, this bent edge is stitched with a thread 6, the thread passing through the tape 5 as well as the sheets 2, 12.

Figure 8:
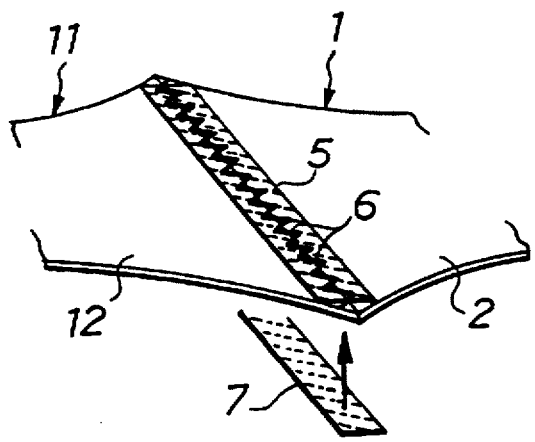
FIG. 8 is a perspective view, illustrating another step of the liner tube connecting method of the present invention.

Thereafter, the liner tube 1 is picked and turned back to straighten the tentatively integral tube, and, as shown in FIG. 8, the resin absorbent sheets 2, 12 are now bound together firmly by the thread 6 zigzagging along the oblique meeting line. Next, a thin adhesive tape 7 similar as the tape 5 is pasted on the outer side of the sheets 2, 12 in a manner such that the tape 5 covers the stitch 6 entirely.

Figure 9:
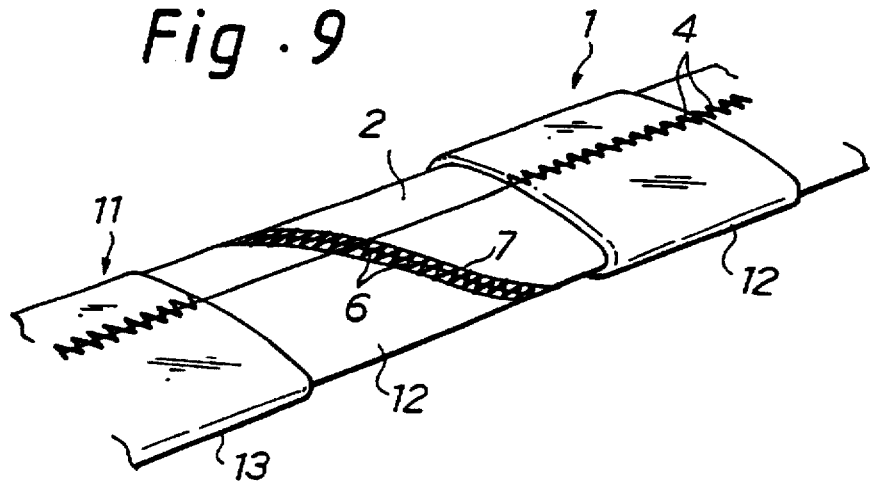
FIG. 9 is a perspective view of two liner tubes, illustrating another step of the liner tube connecting method of the present invention.

When the resin absorbent sheets 2, 12 are thus sewn together, they are rolled up until they become tubular, as shown in FIG. 9, and the tube is closed by re-stitching along the seam so that the stitch 4, 14 becomes unbroken.

Figure 10:
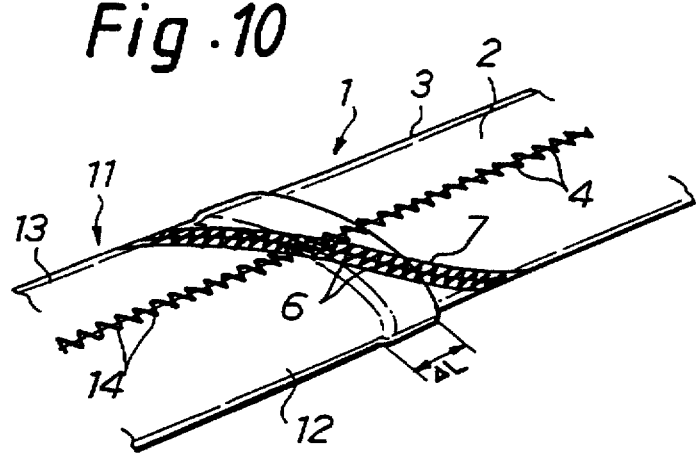
FIG. 10 is a perspective view of two liner tubes, illustrating another step of the liner tube connecting method of the present invention.

Next, the overturned plastic films 3, 13 are unfolded to cover the exposed portions of the resin absorbent sheets 2, 12, and at this time since the exposed portions of the sheets 2, 12 are now shorter than before, the unfolded films 3, 13 overlap one over the other by some length ΔL, as shown in FIG. 10.

Figure 11:
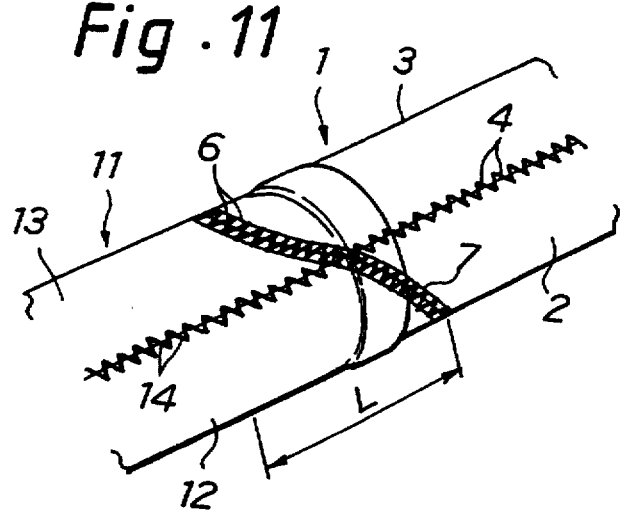
FIG. 11 is a perspective view of two liner tubes, illustrating another step of the liner tube connecting method of the present invention.
Figure 12A:
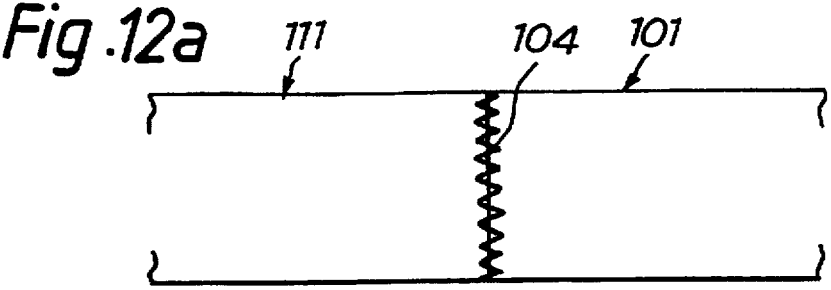
FIG. 12a and 12b show a structure for connection in two top plan views of liner tubes connected according to a conventional method.
Figure 12B:
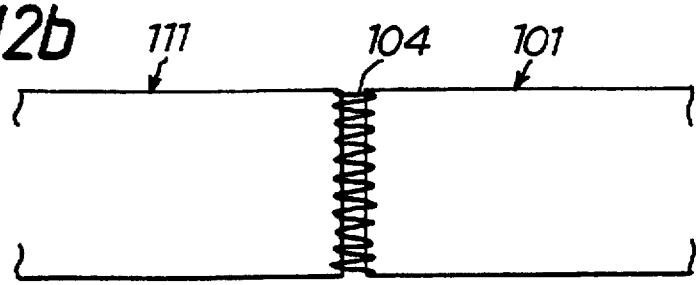
Figure 13A:
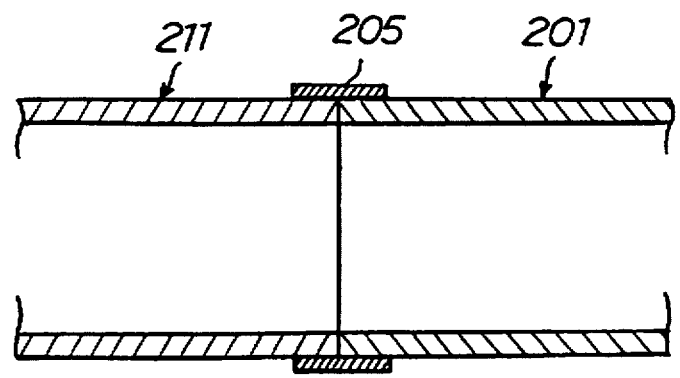
FIG. 13a and 13b show a structure for connection in two sectional views wherein liner tubes are connected according to another conventional method.
Figure 13B:
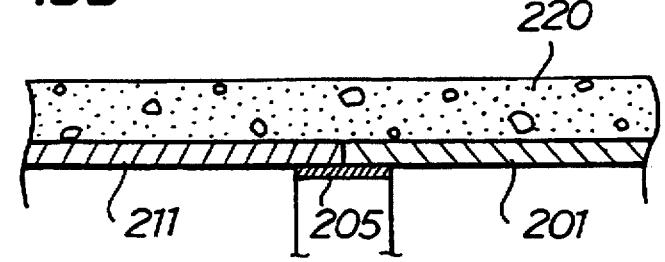

While the things are maintained as shown in FIG. 10, the air in the resin absorbent sheets 2, 12 is drawn by a vacuum pump, not shown, whereupon the loosely enveloping film tubes 3, 13 are tightly pressed against the outer surface of the tubular resin absorbent sheets 2, 12, as shown in FIG. 11. While the operation of the vacuum pump is thus maintained, the plastic film tubes 3, 13 are heated whereupon the film tubes shrink and fuses to adhere to the outer surface of the resin absorbent sheets 2, 12, and thus the outer surface of the tubular sheets 2, 12 is coated with the air-tight layer, and the connection of the two liner tubes 1, 11 is completed.

The liner tubes 1, 11, which are coupled together through the series of operation as described above, are then ready to be used to line and repair a pipe only after the sheets 2, 12 are soaked through with a curable liquid resin.

In the above embodiment, the two liner tubes 1, 11 are stitched together along the obliquely cut ends of the sheets 2, 12 so that the length of the stitching becomes much longer than that in the case of stitching along the cut ends which are cut orthogonally to the seams of the liner tubes, and this will result in a stronger joining strength, and consequently even after the curable liquid resin wetting the tubular sheets 2, 12 is cured, the jointed ends do not detach from each other and a gap is scarcely formed between the ends.

Also, now that the sheets 2, 12 are rolled up, the thin tape 5 pasted on the inner side of the sheets 2, 12 extends spirally across a region of a length L (FIG. 11), which is a distance between the ends of the tape 5 measured in the direction of the seam 4, 14, so that the tape 5 does not form an inwardly protruding ring that would constrict the passage in the pipe 1, 11 at the joint location. Thus, the reduction in the inner diameter of the repaired pipe will not be more than that caused by the liner tubes 1, 11.

While the invention has been described in its preferred embodiment, it is to be understood that modifications will occur to those skilled in the art without departing from the spirit of the invention. The scope of the invention is therefore to be determined solely by the appended claims.

What is claimed is:

1. A tubular liner comprising an inner layer of a resin-absorbable sheet and an outer layer of hermetic plastic film, for use in lining the inner wall of a pipe, which tubular liner comprises at least two liner tubes connected in series, wherein any of two neighboring liner tubes are connected to each other end to end with stitches binding abutted ends of the respective liner tubes closely together, which stitches form a spiral seam.

2. A tubular liner comprising an inner layer of a resin-absorbable sheet and an outer layer of hermetic plastic film, for use in lining the inner wall of a pipe, which tubular liner comprises at least two liner tubes connected in series, wherein any of two neighboring liner tubes are connected to each other end to end with stitches binding abutted ends of the respective liner tubes closely together, which stitches form a spiral seam, wherein said stitches bind abutted ends of respective resin-absorbable sheets of said neighboring liner tubes together.

3. The tubular liner according to claim 2, wherein an adhesive tape is applied to the inner wall and the outer wall of the resin-absorbable sheet along the spiral seam.

\* \* \* \* \*